US011922137B1

(12) United States Patent
Veiga et al.

(10) Patent No.: US 11,922,137 B1
(45) Date of Patent: Mar. 5, 2024

(54) ARCHITECTURE DISCOVERY

(71) Applicant: OutSystems—Software em Rede, S.A., Linda-a-Velha (PT)

(72) Inventors: Hugo Miguel Ferrão Casal da Veiga, Lisbon (PT); António Manuel de Carvalho dos Santos Alegria, Lisbon (PT); Rui Valdemar Pereira Madaleno, Lisbon (PT)

(73) Assignee: OutSystems—Software em Rede, S.A. (PT)

( * ) Notice: Subject to any disclaimer, the term of this patent is extended or adjusted under 35 U.S.C. 154(b) by 0 days.

(21) Appl. No.: 17/399,983

(22) Filed: Aug. 11, 2021

Related U.S. Application Data

(60) Provisional application No. 63/110,330, filed on Nov. 5, 2020, provisional application No. 63/117,895, filed on Nov. 24, 2020, provisional application No. 63/117,899, filed on Nov. 24, 2020.

(51) Int. Cl.
| | |
|---|---|
| *G06F 8/20* | (2018.01) |
| *G06F 8/10* | (2018.01) |
| *G06F 8/72* | (2018.01) |
| *G06F 18/21* | (2023.01) |
| *G06F 18/2113* | (2023.01) |
| *G06N 3/04* | (2023.01) |

(52) U.S. Cl.
CPC ............... *G06F 8/10* (2013.01); *G06F 8/72* (2013.01); *G06F 18/2113* (2023.01); *G06F 18/2178* (2023.01); *G06N 3/04* (2013.01)

(58) Field of Classification Search
CPC ........................................................ G06F 8/20
See application file for complete search history.

(56) References Cited

U.S. PATENT DOCUMENTS

| | | | |
|---|---|---|---|
| 6,269,474 B1 * | 7/2001 | Price ........................ | G06F 8/70 717/136 |
| 2005/0113098 A1 * | 5/2005 | Cankaya ............. | H04J 14/0227 455/445 |
| 2006/0085799 A1 * | 4/2006 | Hoerle .................... | G06F 9/541 719/328 |
| 2007/0237161 A1 * | 10/2007 | Akisada ................ | G06F 13/102 719/324 |
| 2012/0150797 A1 * | 6/2012 | Landy .................. | G06F 16/254 707/610 |

(Continued)

OTHER PUBLICATIONS

Sylvestre Ledru, "Making the Building of Firefox Faster for You with Clever-Commit from Ubisoft", from <https://blog.mozilla.org/futurereleases/2019/02/12/making-the-building-of-firefox-faster-for-you-with-clever-commit-from-ubisoft/>, Feb. 12, 2019.

(Continued)

*Primary Examiner* — Jae U Jeon
(74) *Attorney, Agent, or Firm* — Van Pelt, Yi & James LLP

(57) ABSTRACT

A specification of a program code component module implementing a portion of a program application is received. A trained machine learning model is used to automatically predict to which one among a plurality of program architecture layer classifications the program code component module belongs. An automatic analysis option is selected based on the predicted program architecture layer classification for the program code component module. The selected automatic analysis option is performed on the program code component module.

19 Claims, 10 Drawing Sheets

(56) References Cited

U.S. PATENT DOCUMENTS

| | | | |
|---|---|---|---|
| 2012/0250494 A1* | 10/2012 | Rong | H04L 47/522 370/216 |
| 2012/0271810 A1* | 10/2012 | Liu | G06F 16/35 707/706 |
| 2017/0212729 A1* | 7/2017 | Sridhar | G06F 8/60 |
| 2017/0262868 A1* | 9/2017 | Manjunath | G06Q 30/016 |
| 2018/0089561 A1 | 3/2018 | Oliner | |
| 2018/0157734 A1* | 6/2018 | Drushku | G06F 16/285 |
| 2018/0203674 A1* | 7/2018 | Dayanandan | G06F 8/35 |
| 2019/0018400 A1* | 1/2019 | McCann | B33Y 10/00 |
| 2019/0095764 A1* | 3/2019 | Li | G06K 9/6256 |
| 2019/0251440 A1* | 8/2019 | Kasiviswanathan | G06N 3/063 |
| 2019/0266070 A1 | 8/2019 | Bhandarkar | |
| 2020/0005219 A1 | 1/2020 | Stevens | |
| 2020/0097261 A1 | 3/2020 | Smith | |
| 2020/0183555 A1* | 6/2020 | Al-Sallami | G06Q 20/12 |
| 2020/0183664 A1* | 6/2020 | Lee | G06F 8/38 |
| 2020/0192652 A1* | 6/2020 | Worsnop | G06F 8/61 |
| 2020/0371778 A1* | 11/2020 | Ni | G06F 8/70 |
| 2021/0012209 A1* | 1/2021 | Sikka | G06N 3/084 |
| 2021/0192355 A1* | 6/2021 | Loebl | G06N 3/088 |
| 2021/0303447 A1 | 9/2021 | Haze | |
| 2022/0019496 A1 | 1/2022 | Lozano | |

OTHER PUBLICATIONS

Tony Beltramelli, "pix2code: Generating Code from a Graphical User Interface Screenshot", Sep. 19, 2017.

Tingting Chang, "Using OpenCV to transform screen designs into low-fi block designs", from <https://medium.com/pushtostart/lo-fi-transformer-a3c65eeae70>, Mar. 19, 2019.

William Blum, "Neural Fuzzing: applying DNN to software security testing", from <https://www.microsoft.com/en-us/research/blog/neural-fuzzing/>, Nov. 13, 2017.

Zann Yap, "Intelligent Automations with Machine Learning and AI", from <https://product.workato.com/recipe-iq-intelligent-automations/>, Jul. 18, 2017.

Amanda Silver, Introducing Visual Studio IntelliCode, Microsoft DevBlogs, pp. 1-5, May 7, 2018.

Author Unknown, "Firedrop AI: The machine that will build your next website", retrieved from <https://medium.com/@firedrop/the-machine-that-will-build-your-next-website-90e476241836> on Jun. 8, 2021; published Jun. 1, 2016.

Author Unknown, "Wikipedia: AppSheet", retrieved from <https://en.wikipedia.org/w/index.php?title=AppSheet&oldid=976348103> on Jun. 8, 2021; published Sep. 2, 2020.

Author Unknown, "xgdsmileboy / SimFix", retrieved from <https://github.com/xgdsmileboy/SimFix/blob/master/README.md> on Jun. 8, 2021, published May 28, 2019.

Jason Warner, Introducing the Checks API, a better way to connect integrations and code, The GitHub Blog, pp. 1-7, May 7, 2018.

JS Nice, "Statistical renaming, Type inference and Deobfuscation", Mar. 2018.

Sadowski et al., Lessons from Building Static Analysis Tools at Google, Communications of the ACM, pp. 1-11, Apr. 2018.

Seoul Engineer, Paper Review: 'Lessons from Building Static Analysis Tools at Google', sourcedtech, May 6, 2018.

Sukharev et al., Assisted code review, running custom code analyzers on pull requests, Oct. 10, 2019.

Tadeu Zagallo, Neal, Uber's Open Source Language-Agnostic Linting Platform, uber.com, pp. 1-6, Jan. 31, 2018.

Uri Alon et al., "code2vec: Learning Distributed Representations of Code", Oct. 30, 2018.

Taek Lee et al., Developer Micro Interaction Metrics for Software Defect Prediction, Nov. 2016, [Retrieved on May 12, 2023], Retrieved from the internet: <URL: https://ieeexplore.ieee.org/stamp/stamp.jsp?tp=&arnumber=7447797> 21 Pages (1015-1035) (Year: 2016).

Abhishek Pradhan, "Codota—An AI coding partner", from <https://medium.com/lingvo-masino/codota-an-ai-coding-partner-6fb198381a61>, Aug. 3, 2017.

Akshat Sharma, "6 ways Quizzes in Google Forms are getting smarter", from <https://blog.google/outreach-initiatives/education/6-ways-quizzes-google-forms-are-getting-smarter/>, published May 10, 2018.

Alex Wilhelm, "MonkeyLearn raises $2.2M to build out its no-code AI text analysis service", from <https://techcrunch.com/2020/07/07/monkeylearn-raises-2-2m-to-build-out-its-no-code-ai-text-analysis-service/>, Jul. 7, 2020.

Alon et al., "code2vec: Learning Distributed Representations of Code", Oct. 30, 2018.

Aman Mittal, "How to Create a Chatbot with Dialogflow, NodeJS, and Webhooks", from <https://medium.com/crowdbotics/how-to-create-a-chatbot-with-dialogflow-nodejs-and-webhooks-eecbbce97d8b>, Jul. 19, 2019.

Andrey Cheptsov, "Enjoying Java and Being More Productive with IntelliJ Idea", from <https://blog.jetbrains.com/idea/2016/03/enjoying-java-and-being-more-productive-with-intellij-idea/>, Mar. 3, 2016.

Anne Gao, "Intelligent Visual Studio Search Service", from <https://devblogs.microsoft.com/visualstudio/intelligent-visual-studio-search-service/>, published Mar. 2, 2021.

AppSheet, Wikipedia, from <https://en.wikipedia.org/w/index.php?title=AppSheet&oldid=976348103> last modified Sep. 2, 2020, retrieved on Jun. 2021.

Author Unknown, "A bot disguised as a human software developer fixes bugs", by Emerging Technology from the arXiv, Oct. 23, 2018.

Author Unknown, "Appvance.ai Launches Appvance IQ", Apr. 4, 2018.

Author Unknown, "DeepCode boosts its intelligence and can now explain the reasons behind coding errors", from <https://www.deepcode.ai/blog/deepcode-boosts-its-intelligence-and-can-now-explain-the-reasons-behind-coding-errors>, Oct. 7, 2019.

Author Unknown, "Facebook/infer: Infer version v1.0.0", Oct. 12, 2020.

Author Unknown, "JS Nice: Statistical renaming, Type inference and Deobfuscation", Mar. 2018.

Author Unknown, "QVscribe Launches Latest Engineering Analysis Tool", from <https://innovacorp.ca/news/qvscribe-launches-latest-engineering-analysis-tool>, Feb. 8, 2017.

Author Unknown, "Randoop Manual", from <https://randoop.github.io/randoop/manual/>, May 3, 2020.

Author unknown, "ServiceNow to Acquire Loom Systems", from <https://www.servicenow.com/company/media/press-room/servicenow-to-acquire-loom-systems.html>, Jan. 22, 2020.

Author Unknown, "SimFix/README.md", from <https://github.com/xgdsmileboy/SimFix/blob/master/README.md>, May 28, 2019.

Author Unknown, "The machine that will build your next website by Firedrop AI", from <https://medium.com/@firedrop/the-machine-that-will-build-your-next-website-90e476241836>, Jun. 1, 2016.

Author unknown, "Tutorial 1: Dynatrace—Application Performance Monitoring (APM) Tool", from <https://medium.com/knoldus/tutorial-1-dynatrace-application-performance-monitoring-apm-tool-2f97ec2830a6>, Apr. 12, 2017.

Author Unknown, "Using Flash Fill in Excel", from <https://support.microsoft.com/en-us/office/using-flash-fill-in-excel-3f9bcf1e-db93-4890-94a0-1578341f73f7>, Jun. 8, 2021.

Author unknown, "ZEOS: Why Our Zero-code Environment Will Work for You", Apr. 28, 2020.

Bader et al., "Getafix: Learning to Fix Bugs Automatically", Proc. ACM Program. Lang., vol. 3, No. OOPSLA, Article 159. Oct. 2019.

Barr et al., "The Oracle Problem in Software Testing: A Survey", IEEE Transactions on Software Engineering, vol. 41, No. 5, May 2015.

Bielik et al., "Robust Relational Layout Synthesis from Examples for Android", Proc. ACM Program. Lang., vol. 2, No. OOPSLA, Article 156. Nov. 2018.

Bilal Haidar, "Applitools—The automated visual regression testing framework", from <Jun. 9, 2021 Applitools—The automated visual regression testing framework | by This Dot Media | Medium https://medium.com/@thisdotmedia/applitools-the-automated-visual-regression-testing-framework-18ebada47977>, Oct. 25, 2018.

C. Williams, "Putting AI bots to the test: Test.ai and the future of app testing", Assignment: Value Creation with AI, Dec. 4, 2019.

(56) References Cited

OTHER PUBLICATIONS

Celeste Barnaby, "Aroma: Using ML for code recommendation", from <https://ai.facebook.com/blog/aroma-ml-for-code-recommendation/>, Apr. 4, 2019.
Emil Protalinski, "Dry.io wants to democratize software development using AI", from <https://venturebeat.com/2019/02/26/dry-io-wants-to-democratize-software-development-using-ai/>, Feb. 26, 2019.
Feng et al., "Program Synthesis using Conflict-Driven Learning", Nov. 21, 2017.
Gina Baldassarre, "Stratejos helps teams manage daily admin and coordination of projects", Jul. 17, 2018.
Henning Femmer, "Requirements Quality Defect Detection with the Qualicen Requirements Scout", 2018.
Jain et al., "Sketch2Code: Transformation of Sketches to UI in Real-time Using Deep Neural Network", Oct. 20, 2019.
Jeremias Rößler, "recheck and the "Git for the GUI"", Excerpt from PNSQC Proceedings, Aug. 2020.
Ke Mao, "Sapienz technology leverages automated test design to make the testing process faster, more comprehensive, and more effective.", from <https://engineering.fb.com/2018/05/02/developer-tools/sapienz-intelligent-automated-software-testing-at-scale/>, May 2, 2018.
Kelly Kirkham, "9 Incredible AI Powered Tools to Help Developers Work Smarter", from <https://blog.100tb.com/9-incredible-ai-powered-tools-to-help-developers-work-smarter>, Mar. 19, 2018.
Kevin Hart, "Revuze, turn any textual customer opinion to deep BI automatically", from <https://medium.com/betacrunch/revuze-turn-any-textual-customer-opinion-to-deep-bi-automatically-c538decad944>, Sep. 3, 2019.
Kyle Wiggers, "Google acquires AI customer service startup Onward", from <https://venturebeat.com/2018/10/02/google-acquires-onward-an-ai-customer-service-startup/>, Oct. 2, 2018.
Liam Tung, "As Google enters AI coding autocomplete race, Kite for Python language gets smarter", from <https://www.zdnet.com/article/as-google-enters-ai-coding-autocomplete-race-kite-for-python-language-gets-smarter/>, Sep. 24, 2019.
Mabl, "Maintenance-Free Automated Functional Testing with Auto-Healing Tests", from <https://medium.com/hackernoon/maintenance-free-automated-functional-testing-with-auto-healing-tests-f395cd5857fc>, Feb. 26, 2018.
Marcelo Novaes de Oliveira, "Assisted Code Review", from <https://docs.google.com/document/d/1ULRp10hnGtoc_M1cbfMntxpPuWy-dNrEgjKI5n6Cmrc/edit>, Aug. 17, 2018.
Marginean et al., "SapFix: Automated End-to-End Repair at Scale", Feb. 2019.
Mike Butcher, "Engineer.ai launches its Builder Now platform for rapid app prototyping and building", from <https://techcrunch.com/2019/11/25/engineer-ai-launches-its-builder-now-platform-for-rapid-app-prototyping-and-building/>, Nov. 25, 2019.
Mix, "Airbnb built an AI that turns design sketches into product source code", from <https://thenextweb.com/news/airbnb-ai-sketches-design-code>, Oct. 25, 2017.
Namita Prabhu, "Can you build an integration pipeline for me?", from <https://www.snaplogic.com/blog/iris-integration-assistant>, published May 25, 2017.
Paul Lambert, "Subject: Write emails faster with Smart Compose in Gmail", from <https://www.blog.google/products/gmail/subject-write-emails-faster-smart-compose-gmail/>, published May 8, 2018.
Pradel et al., "DeepBugs: A Learning Approach to Name-Based Bug Detection", Proc. ACM Program. Lang., vol. 2, No. OOPSLA, Article 147. Nov. 2018.
Raghothaman et al., "Difflog: Beyond Deductive Methods in Program Analysis", 2018.
Rory Dickenson, "AI for Enterprise Customer Service: It's All in the Data", from <https://medium.com/ultimate-ai/https-medium-com-ultimate-ai-ai-for-enterprise-customer-service-clustering-64571bfcbdb3>, Nov. 27, 2018.
Soliudeen Ogunsola, "Getting Started with TeleportHQ", from <https://medium.com/visualdevspace/getting-started-with-teleporthq-53a671ec56d5> May 12, 2020.
Sonia Kim, "Neural Code Search: ML-based code search using natural language queries", from <https://ai.facebook.com/blog/neural-code-search-ml-based-code-search-using-natural-language-queries/>, Jun. 24, 2019.

* cited by examiner

ARCHITECTURE DISCOVERY

CROSS REFERENCE TO OTHER APPLICATIONS

This application claims priority to U.S. Provisional Patent Application No. 63/110,330 entitled ANALYZING, IDENTIFYING, AND PREDICTING CODE FOR MACHINE-ASSISTED COMPUTER PROGRAMMING filed Nov. 5, 2020 which is incorporated herein by reference for all purposes. This application claims priority to U.S. Provisional Patent Application No. 63/117,895 entitled MACHINE-ASSISTED COMPUTER PROGRAMMING filed Nov. 24, 2020 which is incorporated herein by reference for all purposes. This application claims priority to U.S. Provisional Patent Application No. 63/117,899 entitled MACHINE-ASSISTED COMPUTER PROGRAMMING filed Nov. 24, 2020 which is incorporated herein by reference for all purposes.

BACKGROUND OF THE INVENTION

A computer program typically includes interrelated modules. In a well-designed architecture, code fits into modules with clear separation of concerns and well-defined Application Programming Interfaces (APIs). An example of a module is a library. Computer program architecture is often defined by how the whole program is structured into separate modules and how those modules interact and depend on one another. In order to form a sound architecture, it is desirable to have modules fit into specific architectural roles, under which they may be classified or categorized. This enables the modules to be more easily reused, reduce dependencies and make the whole architecture more maintainable and easy to evolve over time. However, some developers (typically beginners) do not know how to design modules that fit into specific well-formed categories, and they might create a codebase that results in an undesirable architecture, increasing technical debt. To analyze the code and the architecture and get recommendations on how to improve it with a static analysis tool, developers often need to manually categorize each module, which can be tedious and prevent large enterprise codebases from being analyzed and monitored. Thus, there is a need to automatically categorize/classify computer code.

BRIEF DESCRIPTION OF THE DRAWINGS

Various embodiments of the invention are disclosed in the following detailed description and the accompanying drawings.

DETAILED DESCRIPTION

Figure 1:
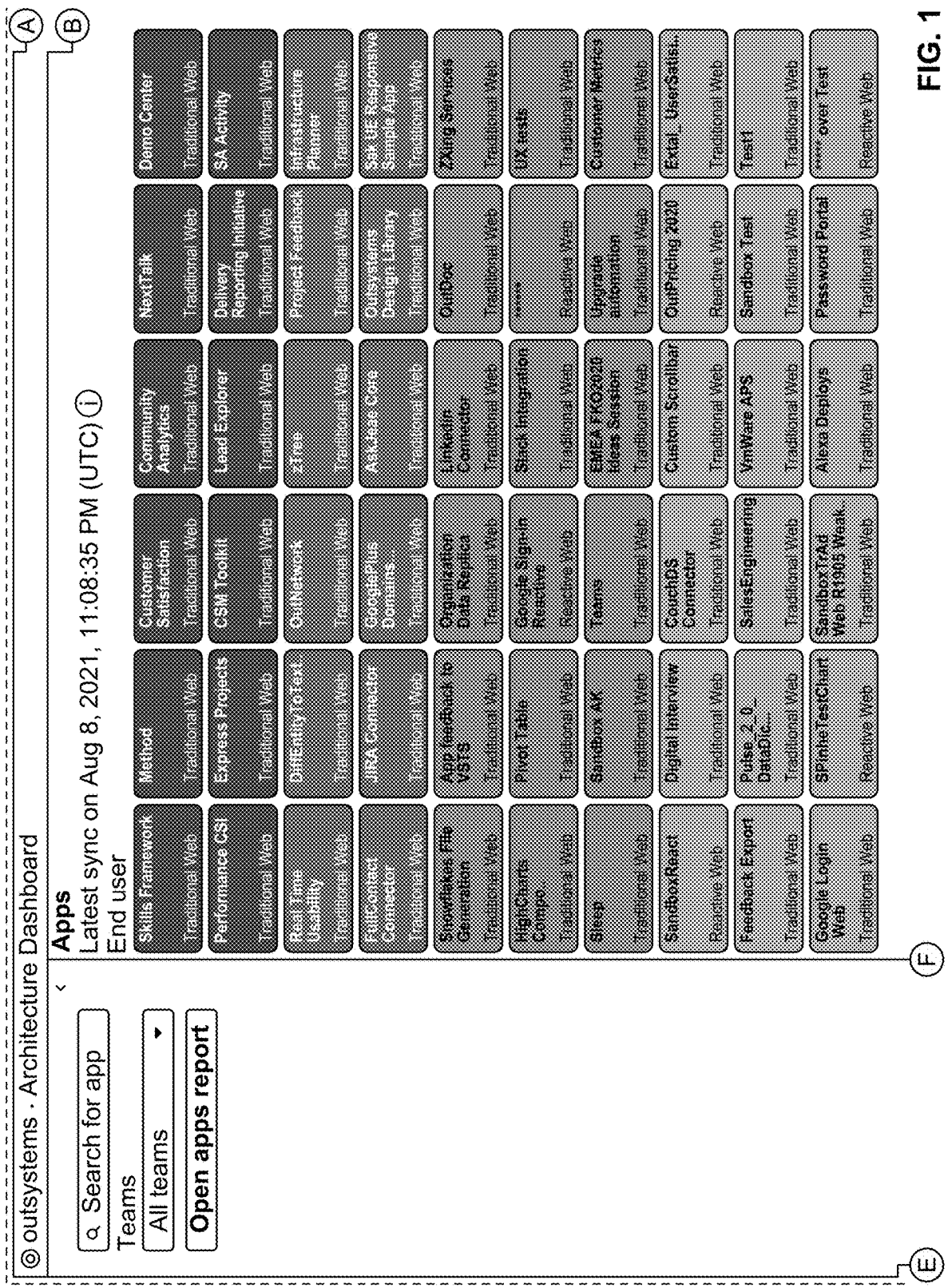
FIG. 1 is a diagram illustrating an example of an architecture dashboard according to some embodiments.
Figure 1:
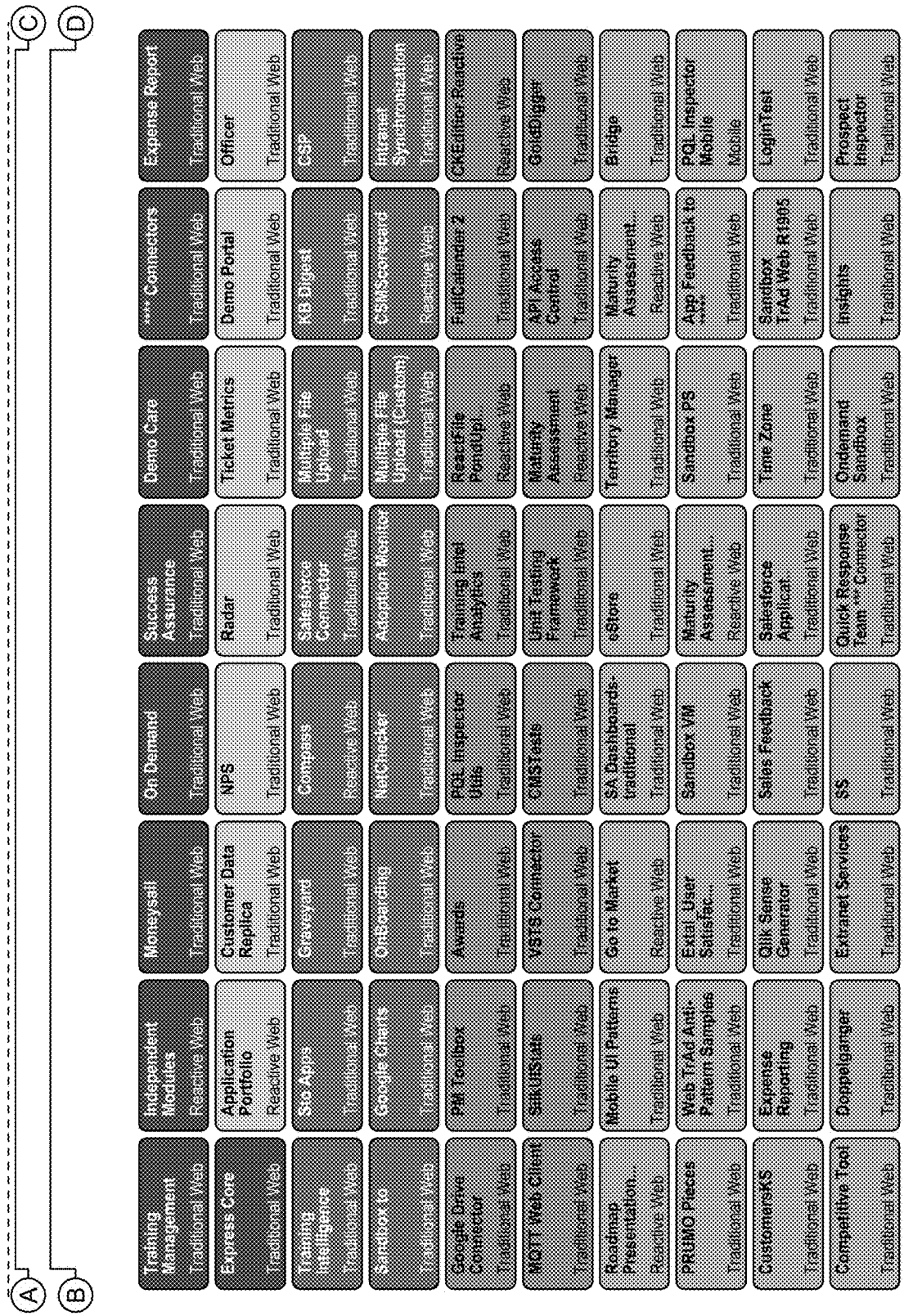
Figure 1:
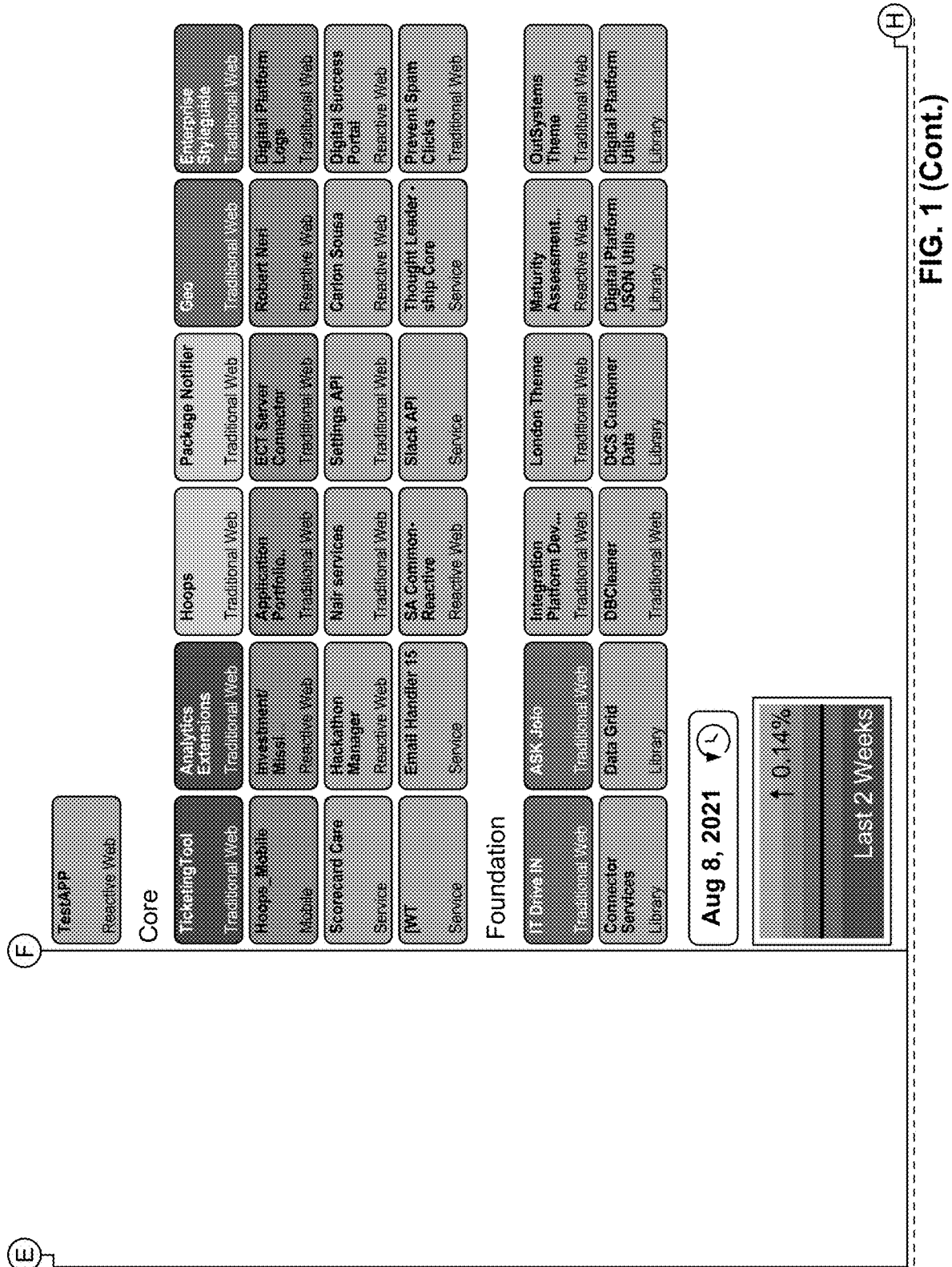
Figure 1:
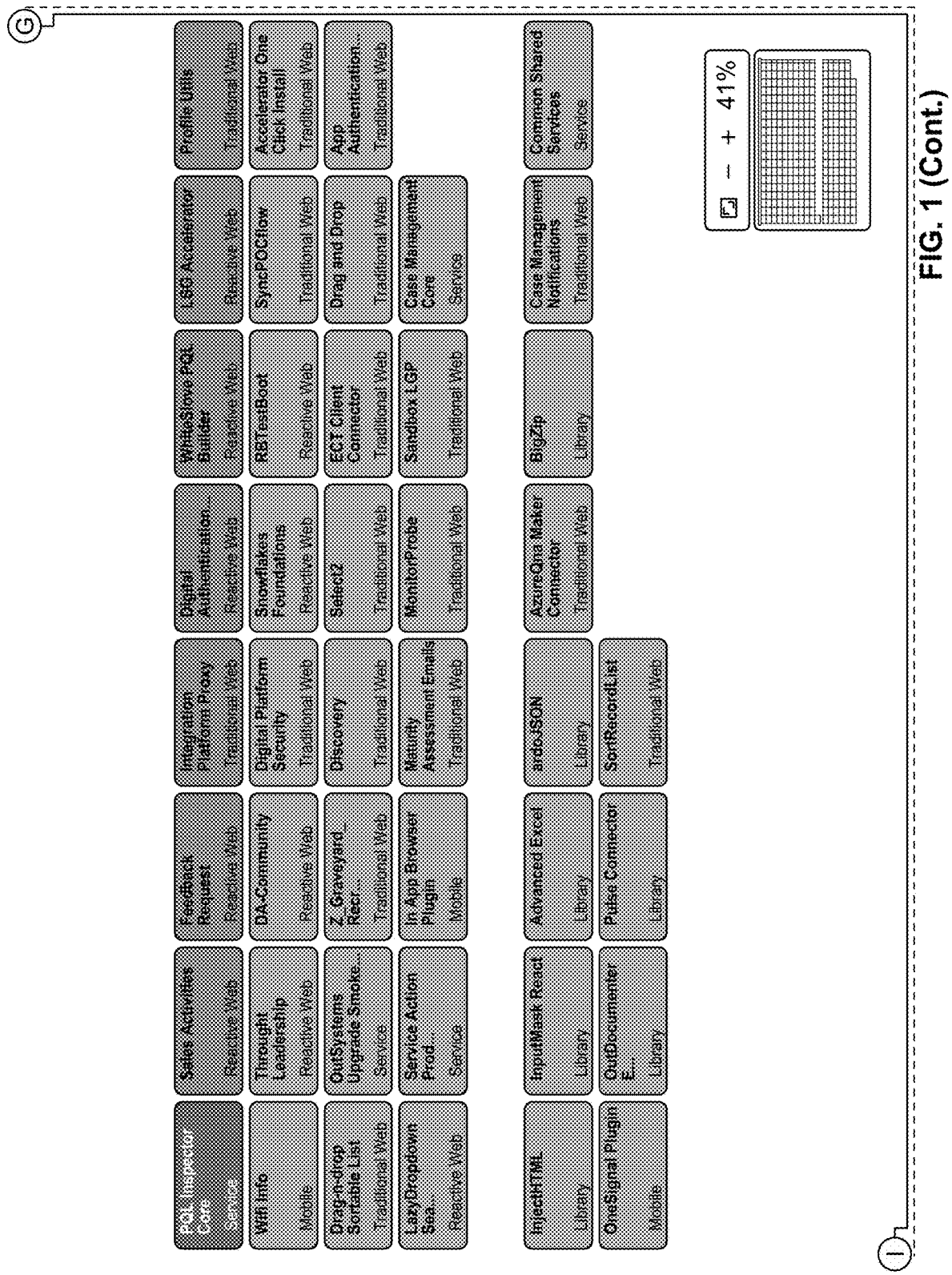

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Code can be encapsulated into a module, which categorizes the code into a respective set of concerns, APIs, and overall role in a computer program architecture. This modularization makes the code easier to reuse, maintain, or otherwise evolve. For example, a module includes a grouping of one or more code assets such as a set of one or more functions, classes, interfaces, logic flows, data tables, screens, user interfaces (UIs), etc. Modules can fit into various systems of categorization, for example a module belongs to one of several layers or roles. One example is Architecture Canvas by OutSystems®, which is further described in FIG. 2. The disclosed techniques are described in the context of the Architecture Canvas, but this is merely exemplary and not intended to be limiting. For example, the techniques can be applied to classify code based on architectural or other characteristics. Typically, it is a designer, a software architect, or other user who manually catalogues the code into modules. This can be tedious and time-consuming, so automatic code categorization techniques are being developed. Modules serve different roles and fit into different categories within a computer program architecture. Knowing these roles enables better static code analysis and code recommendations as well as better architecture analysis and refactoring recommendations.

Techniques for architecture discovery are disclosed. In various embodiments, the disclosed techniques include automating classification of modules according to their expected architectural role, that is, where modules fit in the architecture. Machine learning can be used to analyze the content of code and automatically classify the code into architectural characteristics by mapping a module into classifications (sometimes referred to as "layers" or "roles").

In various embodiments, a process for architecture discovery includes receiving a specification of a program code component module implementing a portion of a program application. The process includes using a trained machine learning model to automatically predict to which one among a plurality of program architecture layer classifications the program code component module belongs. The process includes selecting an automatic analysis option based on the predicted program architecture layer classification for the program code component module, and performing the selected automatic analysis on the program code component module.

The following figures show examples of modules as they relate to factories and an architecture dashboard.

FIG. 1 is a diagram illustrating an example of an architecture dashboard according to some embodiments. An architecture dashboard is a platform for visualizing how a group of code segments (program code component modules) are related to each other. An example is Architecture Dashboard by OutSystems®. Although the architecture dashboard is shown as an example, this is not intended to be limiting as the disclosed techniques find application in various code analysis tools. The architecture dashboard performs code and runtime analysis to recommend solutions for improving performance, security, architecture, and user experience of applications. The code can be created in a variety of ways including via a "low code" or "no-code" software development tool such as ServiceStudio by OutSystems® in which developers design computer programs by interacting with a graphical user interface to visually model program functionality.

A tool such as an architecture dashboard can analyze the code and runtime performance of the work product of many developers. The disclosed architecture discovery techniques can be applied to categorize code into modules, where the modules in turn belong to respective layers or roles. With that categorization, code analysis and recommendation can be tailored to the role and inter-dependencies between modules. The architecture dashboard can help visualize cross-portfolio architectures and interdependencies between modules and provide guidance for best practices and common pitfalls thereby visualizing and managing technical debt. For example, this enables departmental applications to become adopted as organization-wide solutions without needing to rewrite code.

This architecture dashboard shows modules within a factory. A factory refers to a group of code instances or programs/applications (e.g., code repository, codebase, etc.). Different teams within an organization may develop different programs and, collectively, the programs for the organization is called a "factory" or installation. An organization may have one or more factories, e.g., each department has its own factory.

The level of technical debt in each module may be indicated by a visual marker such as the background color of the module. For example, red modules have the most technical debt, orange modules have medium technical debt, and green modules have the least technical debt. Users can drill down into the modules, for example performing the disclosed code duplication identification and refactoring techniques to reduce the technical debt. The categorization of each module within an architecture canvas enables the analysis of technical debt.

Figure 2:
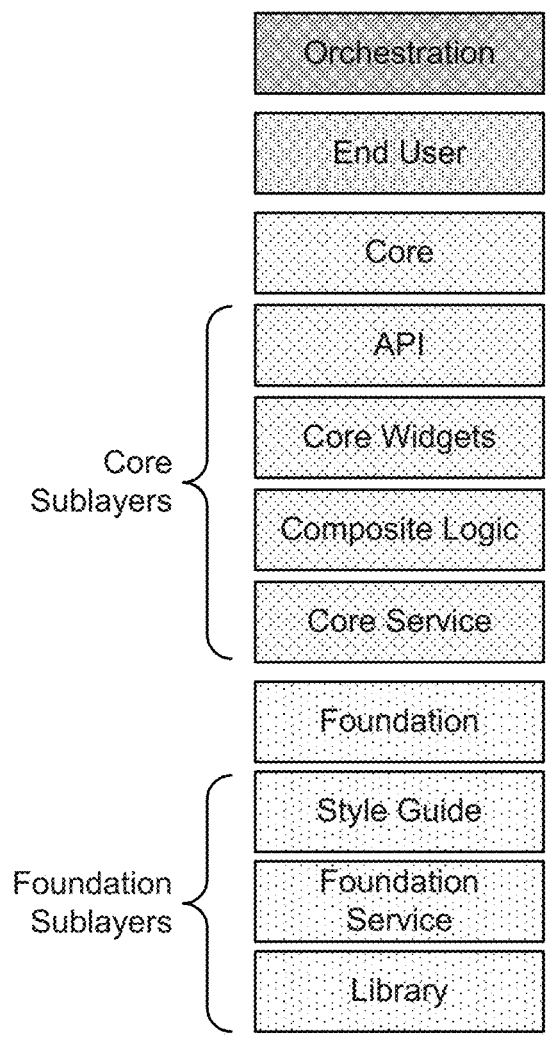
FIG. 2 is a diagram illustrating an example of an architecture canvas according to some embodiments.

FIG. 2 is a diagram illustrating an example of an architecture canvas according to some embodiments. Architecture canvas 200 (such as the one developed by OutSystems®) is an organizational scheme that facilitates the design of Service-Oriented Architectures (SOA). Code can be categorized into modules and the modules can be categorized into a layer within the architecture canvas. The architecture canvas promotes the abstraction of reusable services and the appropriate isolation of distinct functional modules, in cases where multiple applications that reuse common modules are being developed and maintained. In one example, a typical medium to large installation supports over 20 mission critical applications and over 200 interdependent modules.

These applications/modules may have different change life cycles and are typically maintained and sponsored by different teams. New applications tend to evolve quickly while highly reused services tend to change much more slowly. In a well-designed architecture, applications (and modules that compose the applications) will preserve independent lifecycles and decrease to a minimum dependencies and overall change impact. One result is a cost-effective architecture design, which is easier to maintain and evolve. As further described herein, the disclosed techniques automatically categorize code into modules, which in turn fit into the architecture canvas to help build well-designed architectures.

Each layer and sublayer sets a different nature of the functionality to be captured in a module. In this example, there are four layers: orchestration, end user, core, and foundation. The number and types of layers (and sublayers) are merely exemplary and not intended to be limiting. For example, the orchestration layer does not exist in some embodiments. Each layer may also have sublayers. In this example, the core layer includes four sublayers: API, core widgets, composite logic, and core service. The foundation layer includes three sublayers: style guide, foundation service, and library.

The orchestration modules, if applicable, harmonize various frontends to provide a unified user experience or cross-application workflow. The end user modules correspond to user interfaces (UI) and processes including modules that provide functionality to end users. The core modules correspond to reusable services specific to a customer's domain such as implementing rules (including business rules), web-blocks, business services, exporting entities. The foundation modules correspond to services that integrate to external or third party systems or extend a framework.

Referring now to the sublayers, the API sublayer provides APIs to expose core services; the core widgets sublayer provide widgets; the composite logic sublayer provides reusable logic composition or logic to synchronize data; the core service sublayer provides various reusable core services. The style guide sublayer provides reusable UI patterns, themes, and theme templates; the foundation service sublayer provides integration services to wrap-up external services and services to support non-functional requirements (e.g., auditing); the library sublayer provides reusable libraries and plug-ins. Although this example calls them "layers" or "sublayers," they can thought of more generally as "roles" because they are not necessarily hierarchical.

The architecture canvas 200 can be used in various stages of architecture design including identifying concepts and defining modules. With respect to identifying concepts (including functional, non-functional and integration needs), the canvas helps collect architecture requirements in a structured and systematic way. With respect to defining modules, the canvas can be used to design modules that implement the identified concepts, following best practices or recommended patterns. Designing an architecture is typically not a one-time event but rather a continuous process in which a software architect cycles between the two stages as a solution evolves and new concepts and needs emerge. The disclosed techniques analyze code to categorize the code into the identified concepts and/or defined modules.

The disclosed architecture discovery techniques enable factories of any size to be on boarded quickly, analyzes relationships between modules to classify each module into an architecture layer, and identifies the correct architecture canvas subcategory. The following figure shows an example of a process for architecture discovery.

Figure 3:
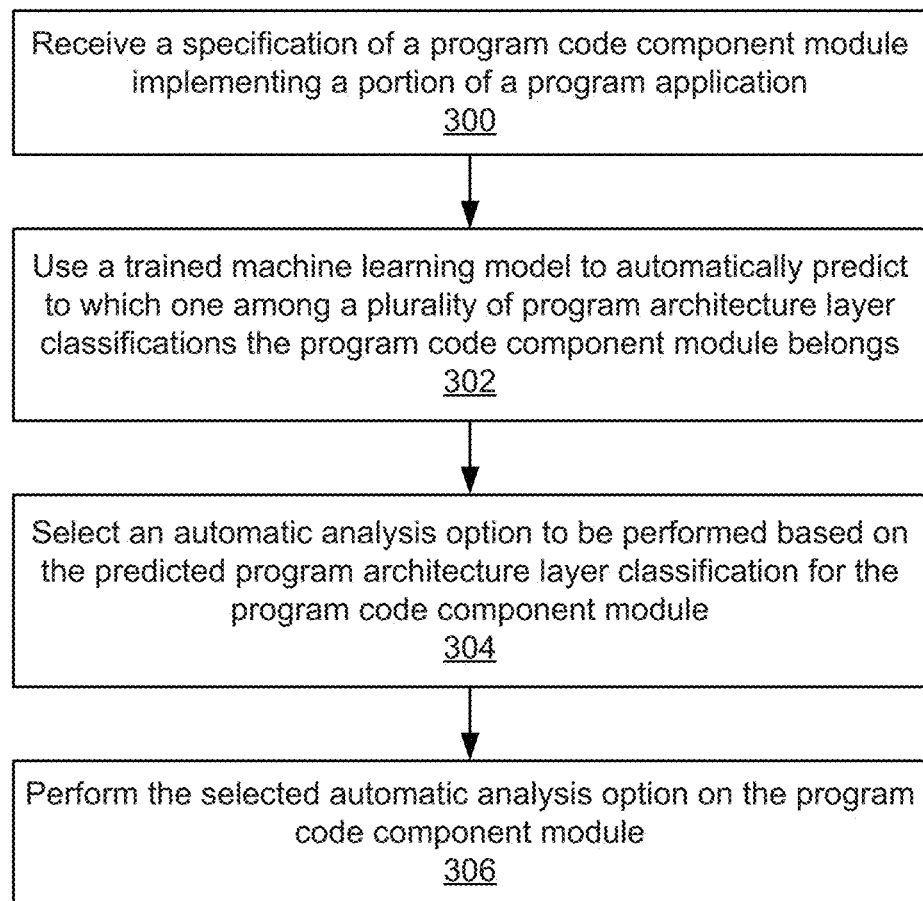
FIG. 3 is a flow diagram illustrating an embodiment of a process for architecture discovery.

FIG. 3 is a flow diagram illustrating an embodiment of a process for architecture discovery. This process may be implemented on a system such as the one shown in FIG. 4. More specifically, the process may be performed by an architecture discovery engine 411 in cooperation with code analysis engine 413 and one or more ML models 414.

The process begins by receiving a specification of a program code component module implementing a portion of a program application (300). In some embodiments, the specification of the program code component captures information across all its layers (e.g., programmatic logic flows, backend code, frontend code, user interface layouts, stylings, configurations, data model(s), etc.). In various embodiments, the specification of the program code component captures information at least in part in a programmatic logic flow, where the programmatic logic flow is textual or graphical (a visual representation). A programmatic logic flow description describes, using abstractions, the intended behavior of a computer software system. Examples of functionality provided by such computer software systems include: login verification, notification, database storage, order processing, electronic wallet, calendar/scheduler, directories, news and information, and so on. The specification can be an intermediate representation of code and may be obtained by processing a programmatic logic flow description. An example of a system for developing program code in the form of a programmatic logic flow is further described with respect to FIG. 4. In some embodiments, the specification of the program code is a text-based specification of program code.

The process uses a trained machine learning model to automatically predict to which one among a plurality of program architecture layer classifications the program code component module belongs (302). The program code component module input to the machine learning model can be textual or graphical.

The machine learning model can be trained using a dataset of program code component modules and corresponding program architecture layer classifications. The data selected to be part of the training dataset can be based on feature engineering, or the code structure can be fed directly to a neural network or other machine learning model types. By way of non-limiting example, features include one or more of the following:

Number of actions, functions, or classes
Number of screens
Whether a module has screens
Whether a module has actions, functions, or classes
Whether the module is consumed by other modules
Dependencies In various embodiments, features that were found to be effective for the end user layer include:

Number of screens of a module
Number of elements named "NoPermission" in a module
Runtime of a module In various embodiments, features that were found to be effective for the core layer include:

Number of modules consuming from a current module (e.g., consumers)
Number of modules producing for a current module (e.g., producers)
Number of actions in a module
Number of web blocks in a module In various embodiments, features that were found to be effective for the foundation layer include:

Binary indicator (i.e., 1 or 0) specifying whether a module is consumed by a foundation layer module
Binary indicator indicating if a module name starts with "template_"
Feature identifying if a module name has a layer canvas naming convention suffix
Number of web blocks in a module A trained machine learning model automatically predicts to which one among a plurality of program architecture layer classifications the program code component module belongs by outputting a confidence score representing a probability that the program code component module belongs to a particular layer classification.

In various embodiments, the process collects features from the program code component module and sends the features to the trained machine learning model. Alternatively, the process can use a machine learning algorithm, such as graph neural networks, trained directly on the module's code structure, without intermediary feature engineering. The trained machine learning model then outputs one or more scores corresponding to program architecture layer classifications to which the program code component module might belong. In other words, the machine learning model outputs scores for each program architecture layer classifications based on the likelihood that the program code component module belongs to that layer. For example, if there are three layers, each layer has a corresponding score, and the one with the highest score is to the one to which the program code component module is assigned. As another example, a program code component module is predicted to belong to a layer if the score is above a threshold. As yet another example, if none of the scores meet a threshold, then a message such as "unknown" can be output. Some examples of layers are those described with respect to the architecture canvas of FIG. 2. In various embodiments, the machine learning model is capable of categorizing a program code component module into a sublayer. This information may or may not be presented. For example, if it is easier for a user to understand a layer (instead of a sublayer), the layer classification may be presented instead of the sublayer classification.

In various embodiments, the program code component module can be determined to fit in more than one layer. For example, the machine learning model outputs a confidence level and if the confidence is high (above a threshold) that the program code component module belongs to several layers then, in some embodiments, this can be an indication that the module has too many concerns and is not well-formed. In this case, it can be recommended that the module is refactored into two or more modules of the identified layers.

In various embodiments, a user can override a prediction made by the trained machine learning model and designate a specific layer classification. This feedback can be provided to the machine learning model to further improve its performance.

In some embodiments, the program code component module input to the machine learning model is graphical. The graph can be input to a graph neural network. In this approach, rather than performing feature engineering described above, the graph neural network learns the most important characteristics of the graph corresponding to the program code component module.

The process selects an automatic analysis option based on the predicted program architecture layer classification for the program code component module (304). For example, once the program code component module has been classified, then the appropriate type of analysis can be identified and applied to the program code component to discover patterns within the code. The classification (302) may help to improve code analysis because specific rules or analysis may be applied to specific layers. For example, the analysis performed for code belonging to an end user layer is different from the analysis performed for code belonging to a foundation layer. In some embodiments, although the same automatic analysis program is executed regardless of the predicted program architecture layer classification, performance of the automatic analysis program is dependent on the predicted program architecture layer classification. In some embodiments, if no classification is determined or provided, no automatic analysis is to be performed.

Each layer may have a set of rules to analyze code that belongs to a layer. By way of non-limiting example, one rule is that a module in a lower layer should not call a function code n layers above (or below) that layer. Another rule is not having circular dependencies or other dependencies within a same layer. Yet another rule specific to the foundation layer is that it should not have code related to UIs. If a rule is broken, then this indicates that the coding practice or pattern is undesirable and a software architect can be notified to help the software architect improve coding practices. The rules would be applied to the program code component module to determine whether there is code calling a function n layers above (or below) the layer, there are circular dependencies, there is code related to UIs, etc.

The process performs the selected automatic analysis option on the program code component module (306). The selected automatic analysis option described with respect to 304 can be applied to the program code component module and feedback can be output such as:

No upward references (because an upward reference tends to create a cluster where modules have a circular dependency)

No side references among end users or orchestrations (because a module can become unnecessarily coupled to another module and inherit downward references)

No cycles among cores or libraries (because cycles may cause unexpected effects and make code hard to manage)

Wrap Extensions in modules

Avoid circular references between modules

Clearly define the responsibilities of each module

Remove unused references

Encapsulate business logic in User Actions

Create user story driven interfaces

No isolation of a data model in one module. Modules should be functional units instead of architectural units.

Use asynchronous logic when possible

Figure 4:
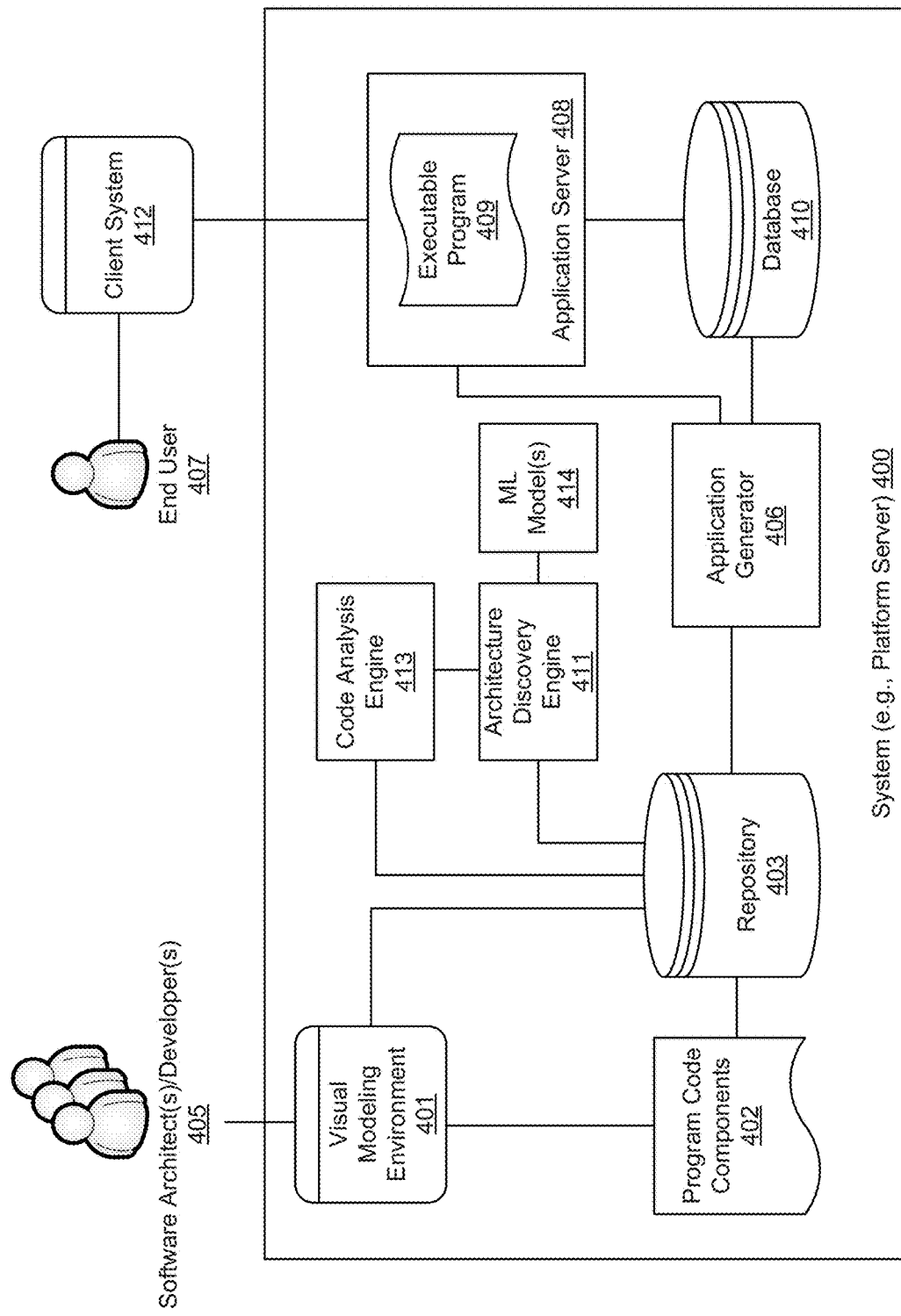
FIG. 4 is a block diagram illustrating an embodiment of a system for architecture discovery.

FIG. 4 is a block diagram illustrating an embodiment of a system for architecture discovery. The system 400 includes a visual modeling environment 401, a repository 403, an application generator 406, an application server 408, and database 410.

Although the example of FIG. 4 is being described in the context of a visual programming environment, architecture discovery is not limited to visual programming but is also applicable to other programing paradigms including text-based programming. Software developer(s)/architect(s) 405, including a user who is designated with the task of designing computer software design models, uses a modeling environment 401 (e.g., Service Studio by OutSystems®) to edit, generate and modify program code components (e.g., including programmatic logic flows) using a graphical user interface. The visual modeling environment 401 facilitates the visual construction and modification of the program code components in a user friendly and intuitive way. For example, the visual modeling environment 401 may allow a user to visually select elements of a program code component (e.g., including a programmatic logic flow), and connect them as desired. The visual modeling environment 401 can be a software program running on a developer's 405 device, or can be software running on a server (e.g., accessed via a browser), or some combination. In one implementation, the visual modeling environment 401 is a combination of a software program running on a developer's computer and a set of software services running on a server being accessed by the modeling environment.

Program code components 402 may include a programmatic logic flow description that describes, using abstractions, the intended behavior of a computer software system. Examples of functionality provided by such computer software systems include: login verification, notification, database storage, order processing, electronic wallet, calendar/scheduler, directories, news and information, and so on. Using the modeling environment 401, it is possible for a developer 405 to model distinct aspects of a computer software system, such as (a) the user navigation and user interface content to be presented to end-users; (b) the business rules that apply to the execution of the interactive events triggered by the end-user; (c) and the data transmission and data repository formats and relationships that support the execution of the application. These distinct aspects, in some implementations, can describe the intended behavior of the computer software system.

The design process of a program (e.g., including programmatic logic flow(s), frontend code, backend code, user interface layout(s), styling(s), configuration(s), etc.) can be assisted by the disclosed techniques. The code analysis engine 413 is configured to analyze code from repository 403. Repository 403 may store various program code components including programmatic logic flow(s), frontend code, backend code, user interface layout(s), styling(s), configuration(s), etc. For example, probes may be set in various programmatic logic flows stored in repository 403. The code analysis engine analyzes (periodically or on demand) data stored in repository 403 (e.g., including the code associated with the programmatic logic flows) and outputs a set of flow locations where specific patterns occur. An example of a pattern is an "if" statement followed by a loop. The code analysis engine may be configured to perform the automatic analysis on the program code component module described with respect to 304 and 306. An example of a code analysis engine is CodeDNA by OutSystems®.

The architecture discovery engine 411 is configured to perform the architecture discovery techniques disclosed herein such as the process of FIG. 3. The architecture discovery engine can classify program code (textual or graphical) into appropriate layers within an architecture canvas by using trained machine learning model(s) 414. This facilitates the work done by the code analysis engine 413 because the type of analysis perform on code may depend on the layer that the code is classified into. Although depicted as local to system 400, the machine learning model(s) 414 may instead be remote in some embodiments.

A user such as developer 405 can access the analysis performed by the code analysis engine 413 or the architecture discovery engine 411 via a code analysis environment such as an architecture dashboard, an example of which is shown in FIG. 1. A graphical user interface such as the example shown in FIG. 5 may be displayed within the code analysis environment.

Designed program code components 402 (e.g., programmatic logic flow(s), frontend code, backend code, user interface layout(s), styling(s), configuration(s), data model(s), etc.) are submitted for storage in repository 403. For example, once a programmatic logic flow is designed, it is compiled into a programmatic logic flow description included in program code components 402 to be submitted to repository 403. The visual representations of the programmatic logic flows in the modeling environment 401 are translated into a structured representation used for processing by other components of the system 400. In some embodiments, the modeling environment 401 is responsible for creating a programmatic logic flow description document from visual representations. The programmatic logic flow description can be generated at various times, for example when a developer 405 triggers the submission of a programmatic logic flow to the repository 403 or in response to developer interaction with the programmatic logic flow such as adding, removing, or modifying a step in the programmatic logic flow.

In one embodiment, the programmatic logic flow description document is structured using XML (Extensible Markup Language). XML is a language that can be used to describe information, or to make information self-describing, and which can facilitate mapping of visual models into a structured representation that can be parsed by other components of the system 400.

The repository 403 stores the program code components 402. By storing versions as development progresses, the repository retains information about how and when a program code component (e.g., a programmatic logic flow) changed over time. At any point in time, an authorized developer 405 can add a new version of a program code component to the repository 403. Additionally, the repository 403 is integrated with the visual modeling environment 401 to support collaboration among concurrent developers 405. In the simplest case, one single developer 405 adds revised versions of a program code component to the repository 403. In more complex implementations, multiple developers 405 retrieve and add distinct versions of a program code component to and from the repository 403. After completing a first version of a program code component, the program code component can continue to be developed, and, by learning with new developments, the model can self-evolve and optimize.

The repository 403 may be based on a database server such as Microsoft SQL Server, Amazon® AWS Database, Oracle® Database and accessed via software services hosted in an application server system. These software services provide to the modeling environment 401 means to submit and retrieve program components as well as to submit and retrieve information about repository 403 content.

In the context of the system 400, an application generator 406 may be used to translate program code components into an implementation of a computer software system. An implemented computer software system may include an executable program 409 to run in an application server 408 and a database definition to be hosted in a relational database system 410. The user navigation and user interface aspects, as well as the business rule and data transmission aspects of the model, are translated into the executable program 409. The executable program can be any executable or interpreted program, for example a web application targeting the .NET® platform from Microsoft®, Java/Jakarta Enterprise Edition (JEE) platform available from Oracle®, or various PHP-based platforms.

The data repository aspects of the computer software system are translated into a database 410. The database can be any sort of relational database. The generated executable program 409 may be automatically configured to access the database 410 according to the designed program code component (e.g., including the programmatic logic flow).

Once the executable program 409 and the database 410 are available on the system 400, respectively in the target application server system 408 and the relational database system 410, the application server system 408 can handle requests from end users 407, for example, using a Hyper Text Transfer Protocol (HTTP) client 412, a mobile client, a Web Browser, a backend system, etc. This means that the elements in the model that denote the way end users see and interact with the computer software system are generated as code, for example Web pages that are hosted in an application server system 408 and served via HTTP to a client 412. A request generates a response that is sent back to client system 412, which then may take the form of a graphical user interface to be displayed to end user 407. Some controls embedded in the graphical user interface may react to subsequent user generated events, and cause the browser to generate subsequent requests back to the application server system 408. For example, when a user presses a button visible in the client system 412, a form may be submitted to the application server system 408 that in response provides the content of a new interactive form to the client system 412.

The work product (e.g., modules) generated by the program code component development process can be stored in a shared library of reusable modules. In various embodiments, anonymized data models and business logic patterns and/or models/patterns can be imported from third party systems.

Examples of anonymized data include:
Source code for cloud customers' software, which indicates how software is created,
Requirements, user stories, support tickets, or the like, which specify what the user wants,
Error logs, which can be analyzed to determine what went wrong with the developed software,
Performance analytics data, which indicate factors that impact processing speed/latency what is fast/slow,
End user satisfaction and feedback data, which indicates what works well and what does not work well,
Integrated development environment (IDE) telemetry data, which indicates how developers create software, or
User interface mockups and final artifacts, which specify how a user wants an application or program to look.

Figure 5:
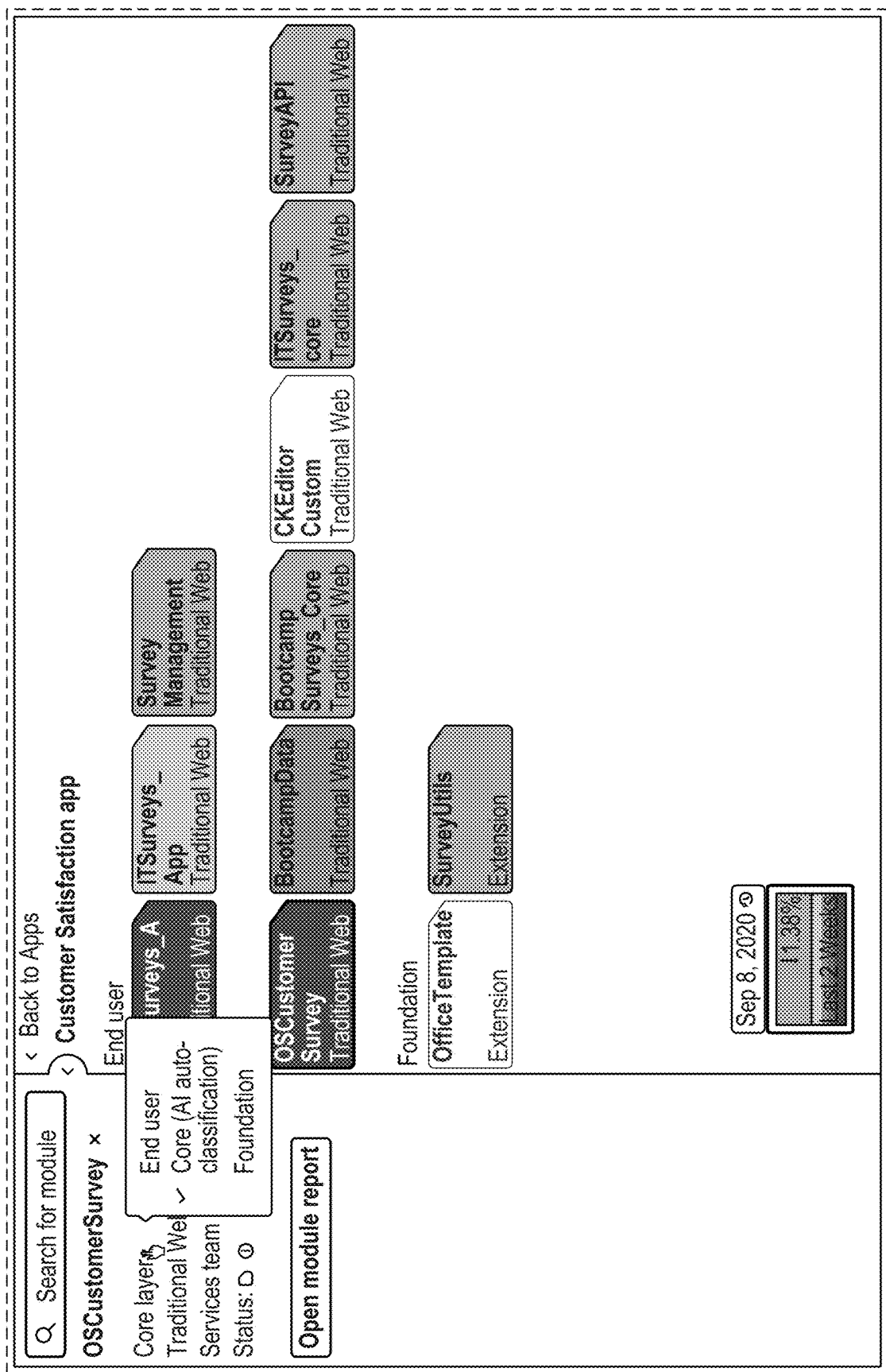
FIG. 5 shows an example of a graphical user interface according to some embodiments.

FIG. 5 shows an example of a graphical user interface according to some embodiments. The graphical user interface may be displayed in an architecture dashboard such as the one shown in FIG. 1 or other code analysis tool. In this example, a code factory includes several modules, where each module is represented by a rectangle (e.g., OSCustomerSurvey is one module, BootcampData is another module, etc.). The disclosed techniques such as the process of FIG. 3 is applied to code associated with OSCustomerSurvey to determine that it belongs in the core layer. This information is represented in this example by placing the rectangle corresponding to OSCustomerSurvey in a row with other modules that also belong to the core layer. This information can also be presented in a menu, here, the left-side menu that shows the layer is "core," and was identified via AI auto-classification.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   training a machine learning model to predict to which one among a plurality of program architecture layer classifications a program code component module belongs, including by:
      forming a training dataset, wherein:
         the training dataset includes a training program code component module and an assignment of the training program code component module to a program architecture layer classification included in the plurality of program architecture layer classifications;
         the program architecture layer classification included in the plurality of program architecture layer classifications identifies a functionality within a computer program that the training program code component module performs;
         the plurality of program architecture layer classifications includes an end user layer, a core layer, and a foundation layer; and
      using the training dataset to train the machine learning model; and
   outputting the trained machine learning model.

2. The method of claim 1, wherein the program code component module includes one or more of the following: a programmatic logic flow, frontend code, backend code, a user interface layout, a styling, or a configuration.

3. The method of claim 1, wherein the program code component module is graphical.

4. The method of claim 1, wherein the program code component module is developed by a low code or no-code development tool.

5. The method of claim 1, wherein:
   at least one layer of the plurality of program architecture layer classifications includes at least one sublayer; and
   the prediction of which one among the plurality of program architecture layer classifications the program code component module belongs includes predicting the at least one sublayer to which the program code component module belongs.

6. The method of claim 1, wherein the plurality of program architecture layer classifications correspond to a pre-defined architecture canvas.

7. The method of claim 1, wherein the trained machine learning model is trained using features including a number of screens in the program code component module.

8. The method of claim 1, wherein the trained machine learning model is trained using features including a number of other modules consuming from the program code component module and/or a number of other modules producing for the program code component module.

9. The method of claim 1, wherein the trained machine learning model is trained using features including a number of web blocks in the program code component module.

10. The method of claim 1, wherein the trained machine learning model is configured to output a score corresponding to a probability that the program code component module belongs to at least one of the plurality of program architecture layer classifications.

11. The method of claim 1, further comprising using the trained machine learning model to automatically predict another one among the plurality of program architecture layer classifications the program code component module belongs.

12. The method of claim 11, further comprising refactoring the program code component between the two program architecture layer classifications to which the program code component module belongs.

13. The method of claim 11, further comprising:
   receiving a user selection of at least one of plurality of program architecture layer classifications to which the program code component module belongs; and
   selecting an automatic analysis option based on the user selection and the predicted program architecture layer classification for the program code component module.

14. The method of claim 1, wherein the trained machine learning model includes a graph neural network.

15. The method of claim 1, wherein each of the program architecture layer classifications has a corresponding set of automatic analysis options, at least one of which is different from at least one automatic analysis option for a different program architecture layer.

16. The method of claim 1, further comprising performing an automatic analysis option on the program code component module including by outputting feedback regarding the program code component.

17. The method of claim 1, further comprising:
   receiving a specification of the program code component module implementing a portion of a program application, wherein the specification of the program code component module is configured to be translated into an executable computer program;
   selecting an automatic analysis option based on the predicted program architecture layer classification for the program code component module; and
   performing the selected automatic analysis option on the program code component module.

18. A system, comprising:
   one or more processors configured to:
      train a machine learning model to predict to which one among a plurality of program architecture layer classifications a program code component module belongs, including by:
         forming a training dataset, wherein:
            the training dataset includes a training program code component module and an assignment of the training program code component module to a program architecture layer classification included in the plurality of program architecture layer classifications;
            the program architecture layer classification included in the plurality of program architecture layer classifications identifies a functionality within a computer program that the training program code component module performs;
            the plurality of program architecture layer classifications includes an end user layer, a core layer, and a foundation layer; and using the training dataset to train the machine learning model; and
output the trained machine learning model; and
a memory coupled to at least one of the one or more processors and configured to provide at least one of the one or more processors with instructions.

19. A computer program product embodied in a non-transitory computer readable medium and comprising computer instructions for:
training a machine learning model to predict to which one among a plurality of program architecture layer classifications a program code component module belongs, including by:
forming a training dataset, wherein:
the training dataset includes a training program code component module and an assignment of the training program code component module to a program architecture layer classification included in the plurality of program architecture layer classifications;
the program architecture layer classification included in the plurality of program architecture layer classifications identifies a functionality within a computer program that the training program code component module performs;
the plurality of program architecture layer classifications includes an end user layer, a core layer, and a foundation layer; and
using the training dataset to train the machine learning model; and
outputting the trained machine learning model.

* * * * *